United States Patent
Shirley et al.

(10) Patent No.: US 6,334,516 B1
(45) Date of Patent: Jan. 1, 2002

(54) ACCELERATION SENSITIVE TWIN TUBE SHOCK ABSORBER

(75) Inventors: David A. Shirley, Rancho Palos Verdes; Donald G. Richardson, Sutter Creek; Frank W. Alioto, Los Angeles, all of CA (US)

(73) Assignee: Edelbrock, Torrance, CA (US)

( * ) Notice: Subject to any disclaimer, the term of this patent is extended or adjusted under 35 U.S.C. 154(b) by 0 days.

(21) Appl. No.: 09/561,408

(22) Filed: Apr. 27, 2000

(51) Int. Cl.[7] ................. F16F 9/34; F16F 9/50; B60G 13/08
(52) U.S. Cl. ................... 188/275; 188/322.14
(58) Field of Search ............. 188/322.13, 314, 188/280, 275, 322.14, 315; 137/38

(56) References Cited

U.S. PATENT DOCUMENTS

| | | | | |
|---|---|---|---|---|
| 2,431,966 A | * | 12/1947 | Rossman | 188/275 |
| 2,512,269 A | * | 6/1950 | Ezbelent | 188/275 |
| 2,957,703 A | * | 10/1960 | Ross | 188/275 |
| 3,127,958 A | * | 4/1964 | Szostak | 188/275 |
| 3,380,560 A | * | 4/1968 | Katz | 188/275 |
| 4,082,169 A | * | 4/1978 | Bowles | 188/275 |
| 4,492,290 A | * | 1/1985 | Zavodny | 188/322.14 |
| 4,917,222 A | | 4/1990 | Bacardit | 188/275 |
| 5,072,813 A | * | 12/1991 | Yoshioka et al. | 188/322.14 |
| 5,285,875 A | * | 2/1994 | Munoz | 188/275 |
| 5,423,402 A | * | 6/1995 | de Kock | 188/275 |
| 5,462,140 A | * | 10/1995 | Cazort et al. | 188/275 |
| 5,598,903 A | | 2/1997 | Richardson | 188/275 |
| 5,823,305 A | | 10/1998 | Richardson et al. | 188/275 |
| 5,954,167 A | | 9/1999 | Richardson et al. | 188/275 |
| 5,992,585 A | * | 11/1999 | Kazmirski et al. | 188/322.14 |

FOREIGN PATENT DOCUMENTS

| | | | | |
|---|---|---|---|---|
| FR | 1125267 | * | 5/1955 | 188/275 |
| GB | 714180 | * | 8/1954 | 188/275 |
| JP | 4296234 | * | 10/1992 | |
| JP | 4337137 | * | 11/1992 | |
| JP | 4337138 | * | 11/1992 | |
| JP | 10267067 | * | 10/1998 | |

* cited by examiner

Primary Examiner—Douglas C. Butler
(74) Attorney, Agent, or Firm—Christie, Parker & Hale, LLP

(57) ABSTRACT

A twin tube shock absorber having inner and outer tube with an annular reservoir between the tubes. A piston in the inner tube divides the inner tube into an upper chamber and a lower chamber and valves through the piston control stiffness of the shock absorber. An acceleration sensitive valve assembly mounted in the base valve makes the shock absorber "soft" upon downward acceleration of the wheel of the vehicle in which the shock absorber is mounted. The valve assembly includes a port for fluid communication between the lower chamber and a conduit, and an inertial mass blocking the port in a port-closed position and not blocking the port in a port-open position. The inertial mass is normally in a lower port-closed position in absence of downward acceleration of the tubes of the shock absorber. Upon downward acceleration of the tubes, the inertial mass moves upwardly toward a port-open position where fluid flow through the port is not blocked.

20 Claims, 2 Drawing Sheets

ACCELERATION SENSITIVE TWIN TUBE SHOCK ABSORBER

BACKGROUND

This invention relates to twin tube vehicle shock absorbers which are typically mounted between the wheels and chassis or body of an automobile, for example. The invention relates to a shock absorber with damping characteristics that change depending upon the acceleration of parts of the shock absorber, most importantly, during downward acceleration of the vehicle wheel.

Shock absorbers which respond to accelerations of a vehicle wheel have demonstrated a remarkable ability to improve the performance of vehicles equipped with such shock absorbers. One such shock absorber has a movable inertia valve for opening a port during downward acceleration of the vehicle wheel. The acceleration sensitive shock absorber further includes means for biasing the inertia valve towards its open position in response to fluid flow through the shock absorber.

One type of shock absorber in current production is a monotube shock absorber with a piston dividing the inside of the tube into an upper chamber and a lower chamber. In an ordinary application, the tube is connected to the body or chassis of a vehicle and the piston is connected by way of a piston rod to the vehicle wheel. An inertia valve is mounted on the piston so that during normal operation the shock absorber is relatively stiff. Upon downward acceleration of the wheel and piston, the inertia valve opens and the shock absorber becomes softer. There are situations where it is desirable to essentially invert this relation so that the piston is connected to the body of the vehicle and the tube to a wheel. It is also desirable to employ a twin tube configuration for certain manufacturing economies. In such an embodiment, the inertia valve is desirably connected to the tubes instead of the piston so as to react upon wheel acceleration.

BRIEF SUMMARY OF THE INVENTION

There is therefore provided in practice of this invention, an acceleration sensitive twin tube shock absorber having an outer tube and an inner tube with an annular reservoir therebetween. A piston movable within the inner tube divides the tube into an upper chamber and a lower chamber. An acceleration sensitive valve assembly is mounted in a base valve in the bottom of the tubes. A conduit interconnects the valve assembly and the upper chamber, and there is a rebound compliance valve for metering fluid flow from the upper chamber to the valve assembly. The valve assembly includes a port for fluid communication between the lower chamber and the conduit, and an inertial mass blocking the port in a port-closed position and not blocking the port in a port-open position. The inertial mass is normally in the port-closed position and is biased toward the port-open position upon downward acceleration of the tubes of the shock absorber. When in the port-open position, the inertial mass does not block the port, thereby permitting fluid to flow.

BRIEF DESCRIPTION OF THE DRAWINGS

These and other features and advantages of the present invention will be better understood by reference to the following detailed description when considered in connection with the accompanying drawings wherein.

DETAILED DESCRIPTION

Figure 1:
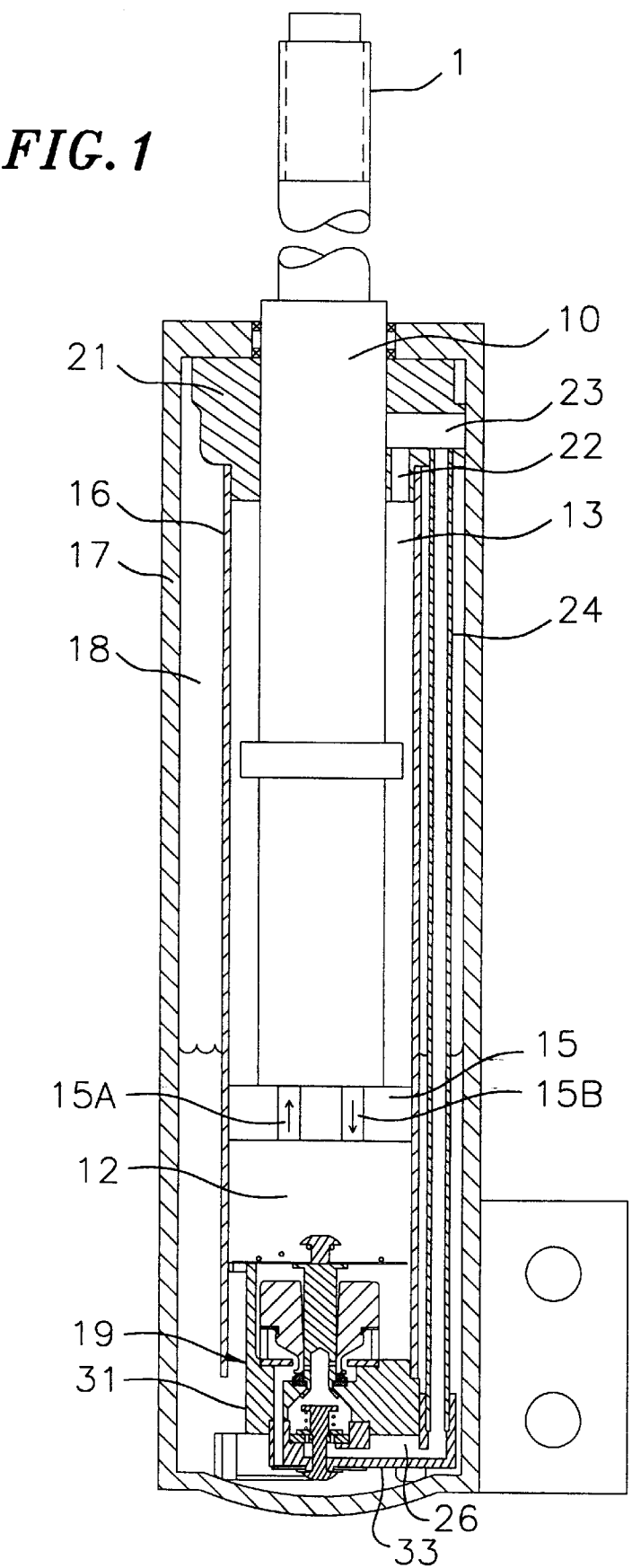
FIG. 1 is a longitudinal cross-section of an acceleration sensitive twin tube shock absorber.

In a twin tube shock absorber a piston assembly 15 is on a piston rod 10 connected to the frame or chassis (not shown) of a vehicle. The piston assembly is mounted in the cylindrical body of the shock absorber, which is connected to the wheel (not shown) of the vehicle. The body has an inner tube 16 surrounded by an outer tube 17. The piston assembly divides the interior of the inner tube into a lower chamber 12 below the piston and an upper chamber 13 above the piston. In this embodiment the piston rod is connected to the chassis by a threaded connector and the tubes are connected to a wheel by a side bracket. These connections are merely representative, and other conventional means for connection, such as mounting rings, are equally applicable. The equivalent mounting arrangements tend to be specific for specific makes and models of vehicles and since they are well known those skilled in the art, they are not further described herein.

Under various conditions fluid can flow between the upper and lower chambers 13 and 12, respectively, and an annulus 18 between the inner and outer tubes. A foot valve or base valve assembly 19 incorporating an inertia valve is mounted in the bottom of the shock absorber and controls flow between the lower chamber and the annulus. The valve at the base of a twin tube shock absorber is called either a base valve or a foot valve. In practice of this invention, an inertia valve has been added.

Typically, a twin tube shock absorber has a gas space in the annulus above the liquid shock absorber fluid and the gas may or may not be pressurized, as desired by the manufacturer. In lieu of a gas space, a twin tube shock absorber may include a closed cell foam immersed in the liquid or a closed gas bag. The compressible gas in the shock absorber accommodates rod displacement of the liquid as the rod moves in or out of the shock absorber tubes.

The rest of the shock absorber, in addition to the means for connecting to the vehicle, is conventional and need not be described or illustrated for an understanding of this invention. For example, the piston assembly includes a compression metering and check valve 15A and an extension or rebound metering and check valve 15B. These valves may be conventional deflected disk valves or other spring loaded types used by various manufacturers. Thus, the piston valves are illustrated only schematically. These valves have spring constants that provide controlled valve opening in response to pressure and limit fluid flow, thereby providing the damping of the shock absorber. These valves control fluid flow and hence the stiffness of the shock absorber, subject to additional control in the base valve assembly 19. Sometimes the compression valve 15A is nothing more than a check valve and metering is largely by way of a compression valve 44 in the base valve assembly.

When mounted as illustrated in FIG. 1, movement of the inertia valve assembly downwardly occurs during extension of the shock absorber, such as, for example, when the wheel moves away from the vehicle as the terrain drops away beneath the vehicle or the wheel rebounds from compression. Upon downward acceleration of the tubes, the inertia valve opens. The shock absorber is relatively "stiff" in the absence of downward acceleration of the wheel. When the inertia valve opens upon downward acceleration of the wheel, the shock absorber becomes relatively "softer". Alternatively, upon compression of the shock absorber, the inertia valve assembly moves upwardly with the tubes and the inertia valve has no effect on stiffness.

A rod guide 21 in the upper part of the shock absorber seals the upper chamber in the inner tube from the annulus 18 between the tubes. There is a longitudinal passage 22 between the upper chamber and a small space 23 within the rod guide. A tube 24 extends longitudinally through the annulus between this space in the rod guide and the inertia valve assembly at the bottom of the shock absorber. These features along with a lateral passage 26 in the base valve assembly form a conduit interconnecting the upper chamber 13 and the inertia valve.

Figure 2:
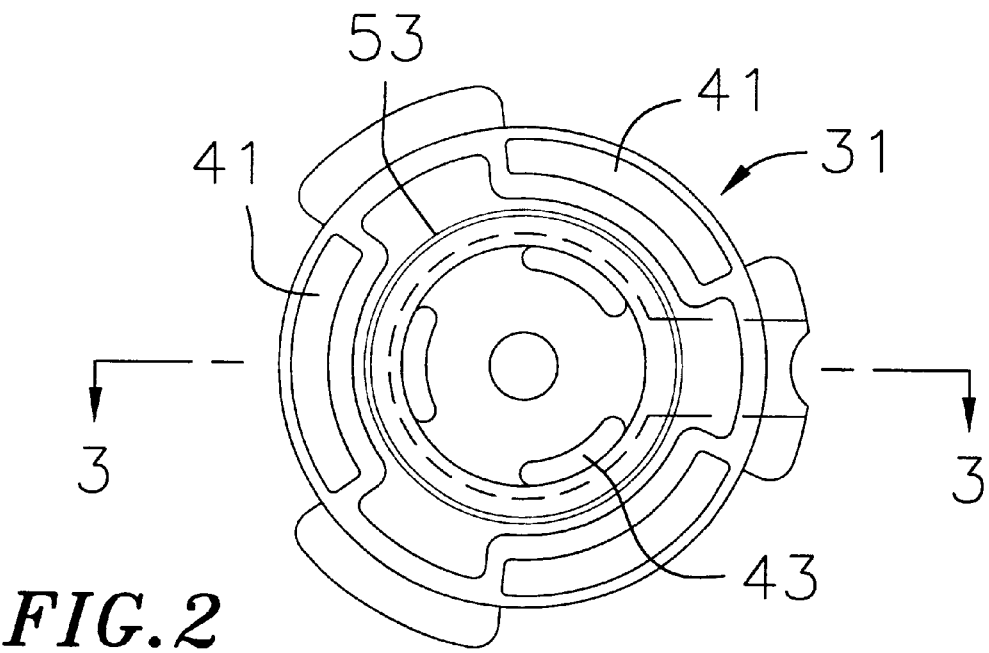
FIG. 2 is a top view of the body of a base valve in the bottom of the shock absorber.

The base valve assembly includes a body 31 having an upper portion inserted into the inner tube. The base valve assembly is best seen in the enlarged longitudinal cross-sectional view of FIG. 3 and the body of the base valve assembly is illustrated in a top view in FIG. 2. The bottom of the body is closed by a cover 33. One leg 32 of the cover extends laterally beyond the bottom of the inner tube to near the outer tube. The tube 24 communicating with the rod guide at the top of the shock absorber seats in the leg 32 of the cover. The bottom face of the cover of the base valve assembly has three circumferentially extending bosses 34 which register in the bottom of the outer tube of the shock absorber by matching tapers on the outside of the bosses and a shallow depression in the bottom of the outer tube.

An axial post 35 staked or riveted into the center of the cover engages a spring 37 for a shock absorber extension or rebound compliance valve disk 36. Increased pressure in the upper chamber upon extension of the shock absorber opens the rebound compliance valve to permit flow from the upper chamber to the inertia valve assembly via the tube 24, transverse space 26, etc. The spring constant of the rebound compliance valve spring 37 (and various dimensions of the rebound valve) provide metering or controlled flow resistance to the fluid flow through the rebound check valve. This provides damping of the shock absorber upon downward extension of the wheel when the inertia valve is opened. Damping upon extension of the shock absorber due to chassis motion is by way of the piston valve.

There is a check valve at the top of the base valve assembly comprising a disk 38 biased against the top of the body by a light spring 39. There are three arcuate passages 41 through an outer edge of the body. A perimeter area of the check valve disk 38 is continuous and covers these passages. Thus, the check valve prevents direct fluid flow from the lower chamber through the passages 41 into the annulus between the tubes. On the other hand, a pressure differential between the annulus and the lower chamber opens the check valve and permits flow through the passages from the annulus to the lower chamber. This is used, for example, to fill the lower chamber with fluid as the piston retracts during extension or rebound of the shock absorber.

There are large openings 42 through the check valve disk 38 to an interior portion of the base valve body in the inner tube. During compression of the shock absorber, fluid can flow from the lower chamber through these openings and through the body of the base valve assembly to longitudinal passages 43 through the lower part of the body and cover. These lower passages 43 are covered by a deflected disk metering valve 44 or similar means such as a disk and compression spring for controlling fluid flow. Upon shock absorber compression, pressure from the lower chamber deflects the disks of the valve 44, permitting fluid flow into the annulus. Relatively stiff disks or springs are used in the disk valve 44 so that the flow resistance through this valve is appreciably greater than the flow resistance through the compression valve 15A through the piston to get compression damping. By having greater flow resistance through the inertia valve assembly than through the piston, it is assured that there is adequate fluid flow from the lower chamber into the upper chamber during compression to avoid cavitation. As indicated above, the compression valve 15A in the piston may be little more than a check valve, and then the disk valve provides essentially all of the compression damping.

A center post 54 is attached to the body of the base valve. The upper end of the post includes a pin 47 which positions the top check valve disk 38 and engages the check valve spring 39. The lower end of the post has an axial hollow 48 and a plurality of radially extending ports 49.

An inertia member or inertial mass 51 surrounds the cylindrical outside of the post. A finger spring 52 extends between the base valve body 31 and a downwardly facing surface of the inertial mass. The finger spring is essentially a washer with four (for example) peripheral fingers cut from the edge of the washer and bent diagonally downwardly to bear against a washer 57 secured to the base valve body. The upper end of the "washer" forming the finger spring has inwardly directed barbs that permit it to snap onto the inertial mass and move with the mass. The finger spring applies a spring load to the inertial mass to reduce the effects of gravity. The spring counteracts the gravity force on the inertia valve to bias the inertial mass toward a significantly reduced weight condition. This permits the inertia valve to commence opening upon very low acceleration of the vehicle wheel.

Figure 3:
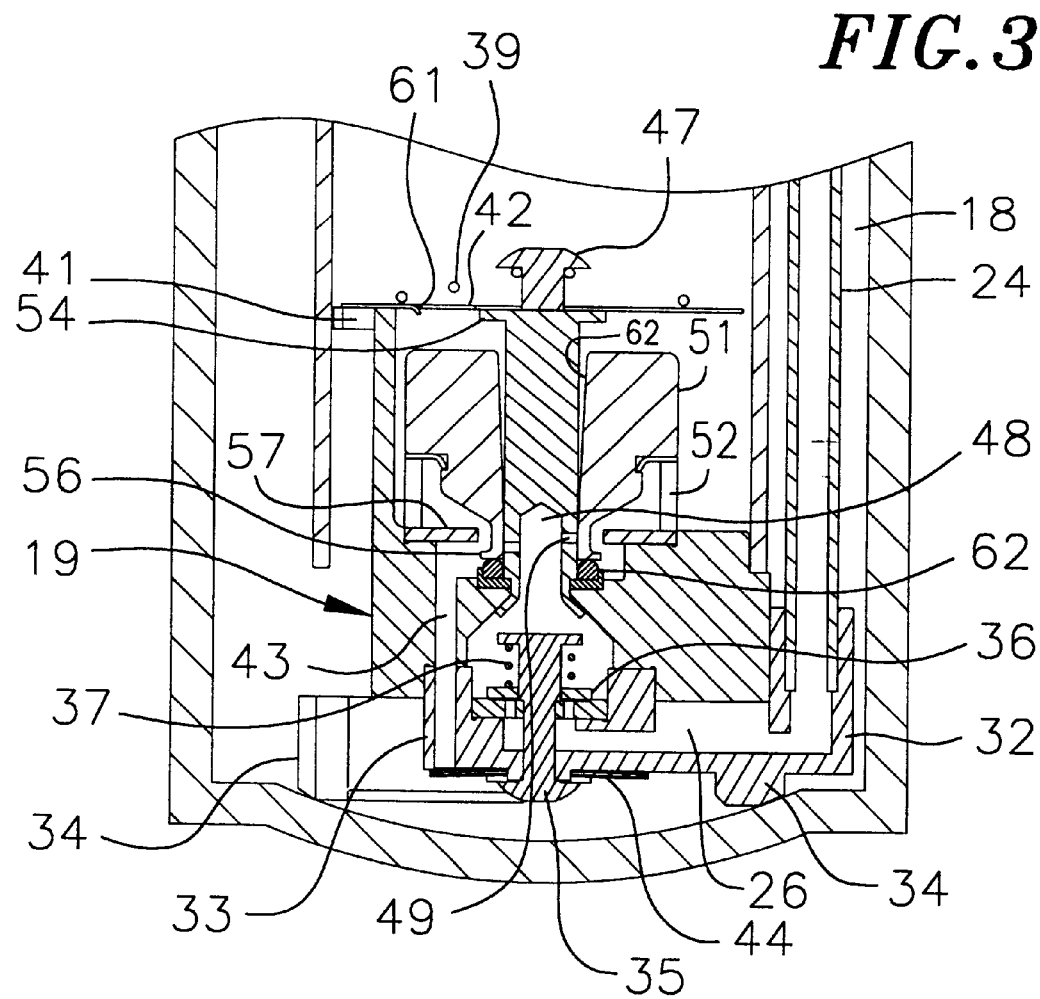
FIG. 3 is an enlarged longitudinal cross-section of the base valve with an inertia valve system.

When there is no acceleration, the inertial mass is in a port-closed or valve-closed position (as illustrated in FIG. 3) where it obstructs and prevents fluid flow through the ports 49. When there is suitable acceleration, the inertial mass moves upwardly to a port-open or valve-open position where it does not obstruct fluid flow through the ports. (Actually, the tubes, ports, etc., move downwardly and the inertial mass stays fixed in space, only apparently moving upwardly relative to the ports.)

A restricted fluid flow path downstream from the fluid ports 49 is provided by a small annular clearance between the bottom edge or lip 56 of the inertial mass and a washer 57 which effectively forms a shoulder inside the body. When the inertia valve is open, i.e., with the inertial mass displaced upwardly, the relative areas and spacings of the ports 49 and the annular restricted flow path are such that the restricted flow path has a smaller area than the ports. That is, when the inertia valve is open, the cross-sectional area for fluid flow through the restricted flow path is less than the cross-sectional area for fluid flow through the ports.

Because of this restricted flow path downstream from the ports, there is a higher pressure below the inertial mass than there is in the lower chamber 12. This hydraulic pressure differential due to the restricted flow path biases the acceleration sensitive inertial mass 51 toward its port-open position. This upward bias continues as long as there is fluid flow, even after acceleration has concluded. The inertial mass has sufficient stroke beyond the initial port-open position that the lip 56 travels beyond the washer 57. This configuration helps the inertia valve to open rapidly after first lifting off the ring 62 at the bottom, as well as remain open during fluid flow.

It has been found to be desirable to rapidly close the inertia valve in the event of compression before the inertia valve is completely closed. In the event of compression, there is increased pressure in the lower chamber, and fluid flows through the openings 42 through the upper disk 38 and pops the deflected disk valve 44 open to permit direct fluid flow from the lower chamber to the annulus 18. This flow applies a downward or closing bias against the inertial mass, particularly as the lip 56 passes the shoulder formed by the washer 57.

Furthermore, as the lower chamber fills from the annulus during shock extension, there is flow through the passages 41 and against the bottom of the top disk 38. A small lip 61 is curled downwardly adjacent an edge of one or more of the openings 42 through the top disk. Some of the flow through the passages is deflected by the lip toward the top of the inertial mass, thereby applying a minor force against the inertial mass to bias it toward the port-closed position or retain it in the port-closed position, for example, during chassis motion (rebound).

There is a short increased diameter relief portion inside the inertial mass. In the illustrated embodiment, the relief portion is in the form of a tapered surface 62 with the smaller diameter end of the taper being adjacent the cylindrical surface in the remaining portion of the inertial mass opposite the ports 49 when the inertia valve is in its port-closed position. The taper has an angle of about two degrees between the tapered surface and the axis of the inertial mass, i.e., about two degrees between the tapered surface and the cylindrical surface of the pin. The smaller end of the taper is approximately the same distance from the ports as the opposite end of the inertial mass is from the ports when the inertial mass is in its port-closed position. With such a relief portion inside the inertial mass, the flow resistance is approximately balanced between the upper and lower ends, respectively, of the inertial mass for improving the consistency of mass produced shock absorbers.

At the bottom of the inertial mass there is a seat 62 comprising a metal ring and an elastomer ring bonded together. The elastomer softens impact of the inertial mass on the body and limits noise. The upper face of the elastomer adjacent to the inertial mass has shallow radial grooves (not shown) which prevent a tight seal against the bottom of the inertial mass. A tight fit could cause sticking and require additional force for opening the inertia valve.

The inertial mass is illustrated in its port-closed position with a lower cylindrical portion of the inside of the inertial mass blocking the ports so that there is no fluid flow. Upon downward acceleration of the vehicle wheel, the tubes and inertia valve assembly move downwardly. The inertial mass, however, essentially remains fixed in space as the lower part of the shock absorber moves downwardly. Thus, in effect, the inertial mass 51 moves upwardly until it engages an upper flange on the pin. This valve-open position of the inertial mass leaves the ports 49 open for fluid flow.

The downward movement of the tubes increases pressure in the upper chamber, thereby causing flow through the metering valve 15B in the piston. When there is acceleration of the wheel in the downward direction, the inertia valve opens and there can also be flow through the rebound compliance valve in the base valve assembly and the ports 49. The rebound compliance valve has less flow resistance than the valve through the piston and the stiffness of the shock absorber becomes much softer when the inertia valve opens. The flow resistance of the rebound compliance valve can be easily set by the spring constant of the spring 37 and a light spring can provide little flow resistance when the inertia valve is open, if desired.

When the shock absorber extends due to chassis motion, for example, fluid flows only through the rebound valve in the piston and the shock absorber is relatively stiff. On the other hand, when the shock absorber extends upon wheel motion and there is downward acceleration, the inertia valve opens and there is flow through the piston valve and also the rebound compliance valve. The compliance valve is in series with the ports and meters flow through the ports to provide some damping and keep the shock absorber from becoming too "soft".

It may be noted that spring loaded check valves and deflected disk check valves are employed in the exemplary shock absorber. These, along with ball check valves and the like, are conventional in shock absorbers and are considered equivalent. These valves may be "easy opening" check valves or may be cheek valves which require significant force and open in amounts proportional to the pressure applied for metering fluid flow.

What is claimed is:

1. A twin tube shock absorber comprising:
   an outer tube;
   an inner tube within the outer tube and an annular reservoir between the tubes;
   a piston movable within the inner tube, dividing the inner tube into an upper chamber and a lower chamber;
   an acceleration sensitive valve assembly mounted in the bottom of the tubes;
   a conduit interconnecting the valve assembly and the upper chamber;
   a port in the valve assembly for fluid communication between the lower chamber and the conduit; and
   an inertial mass blocking the port in a port-closed position and not blocking the port in a port-open position, the inertial mass being normally in a port-closed position in absence of downward acceleration of the tubes of the shock absorber and biased toward a port-open position upon downward acceleration of the tubes of the shock absorber; and
   the inertial mass being adjacent a portion of the valve assembly which prevents movement of the inertial mass to a port-open position in response to upward acceleration of the tubes of the shock absorber.

2. A twin tube shock absorber according to claim 1 wherein the port is in a longitudinally extending cylindrical member and the inertial mass surrounds the cylindrical member with an internal cylindrical surface for closing the port, fluid flow from the upper chamber to the lower chamber being outwardly through the port.

3. A twin tube shock absorber as recited in claim 2 further comprising an increased diameter relief portion inside the inertial mass adjacent to the cylindrical surface for balancing flow resistance between the port and the opposite ends of the inertial mass.

4. A twin tube shock absorber as recited in claim 3 wherein the relief portion comprises a tapered surface inside the inertial mass, the smaller diameter end of the taper being adjacent the cylindrical surface.

5. A twin tube shock absorber as recited in claim 1 wherein the inertial mass is biased toward a significantly reduced weight condition by a spring which counteracts a gravitational force of the inertial mass.

6. A twin tube shock absorber comprising:
   an outer tube;
   an inner tube within the outer tube and an annular reservoir between the tubes;

a piston movable within the inner tube, dividing the inner tube into an upper chamber and a lower chamber;

an acceleration sensitive valve assembly mounted in the bottom of the tubes;

a conduit interconnecting the valve assembly and the upper chamber, wherein the conduit comprises a longitudinally extending tube in the annular reservoir;

a port in the valve assembly for fluid communication between the lower chamber and the conduit; and an inertial mass blocking the port in a port-closed position and not blocking the port in a port-open position, the inertial mass being normally in a port-closed position in absence of downward acceleration of the tubes of the shock absorber and biased toward a port-open position upon downward acceleration of the tubes of the shock absorber.

7. A twin tube shock absorber comprising:

an outer tube;

an inner tube within the outer tube and an annular reservoir between the tubes;

a piston movable within the inner tube, dividing the inner tube into an upper chamber and a lower chamber;

an acceleration sensitive valve assembly mounted in the bottom of the tubes;

a conduit interconnecting the valve assembly and the upper chamber;

a port in the valve assembly for fluid communication between the lower chamber and the conduit;

a rebound compliance valve in the conduit for metering fluid flow from the upper chamber to the valve assembly port; and an inertial mass blocking the port in a port-closed position and not blocking the port in a port-open position, the inertial mass being normally in a port-closed position in absence of downward acceleration of the tubes of the shock absorber and biased toward a port-open position upon downward acceleration of the tubes of the shock absorber.

8. A twin tube shock absorber comprising:

an outer tube;

an inner tube within the outer tube and an annular reservoir between the tubes;

a piston movable within the inner tube, dividing the inner tube into an upper chamber and a lower chamber;

an acceleration sensitive valve assembly mounted in the bottom of the tubes;

a conduit interconnecting the valve assembly and the upper chamber;

a port in the valve assembly for fluid communication between the lower chamber and the conduit; and an inertial mass blocking the port in a port-closed position and not blocking the port in a port-open position, the inertial mass being normally in a port-closed position in absence of downward acceleration of the tubes of the shock absorber and biased toward a port-open position upon downward acceleration of the tubes of the shock absorber; and wherein the valve assembly comprises:
- a base valve assembly mounted in the bottom of the shock absorber and having a portion in the inner tube;
- a check valve restricting flow from the lower chamber to the annulus and permitting flow from the annulus into the lower chamber;
- a fluid metering valve for metering flow from the lower chamber into the annulus;
- a longitudinally extending cylindrical member, wherein the port is in the cylindrical member; and wherein the inertial mass surrounds the cylindrical member with an internal cylindrical surface for closing the port, the port being in communication with the conduit for fluid flow from the upper chamber to the lower chamber outwardly through the port.

9. A twin tube shock absorber comprising:

an outer tube;

an inner tube within the outer tube and an annular reservoir between the tubes;

a piston movable within the inner tube, dividing the inner tube into an upper chamber and a lower chamber;

an acceleration sensitive valve assembly mounted in the bottom of the tubes;

a conduit interconnecting the valve assembly and the upper chamber;

a port in the valve assembly for fluid communication between the lower chamber and the conduit;

an inertial mass blocking the port in a port-closed position and not blocking the port in a port-open position, the inertial mass being normally in a port-closed position in absence of downward acceleration of the tubes of the shock absorber and biased toward a port-open position upon downward acceleration of the tubes of the shock absorber; and a compression check valve for metering fluid flow from the lower chamber to the annulus upon compression of the shock absorber.

10. A twin tube shock absorber comprising:

an outer tube;

an inner tube within the outer tube and an annular reservoir between the tubes;

a piston movable within the inner tube, dividing the inner tube into an upper chamber and a lower chamber;

an acceleration sensitive valve assembly mounted in the bottom of the tubes;

a conduit interconnecting the valve assembly and the upper chamber;

a port in the valve assembly for fluid communication between the lower chamber and the conduit;

an inertial mass blocking the port in a port-closed position and not blocking the port in a port-open position, the inertial mass being normally in a port-closed position in absence of downward acceleration of the tubes of the shock absorber and biased toward a port-open position upon downward acceleration of the tubes of the shock absorber;

a compression check valve for metering fluid flow from the lower chamber to the annulus upon compression of the shock absorber; and a flow passage to the compression check valve including an inlet adjacent to an upper portion of the inertial mass.

11. A twin tube shock absorber comprising:

an outer tube;

an inner tube within the outer tube and an annular reservoir between the tubes;

a piston movable within the inner tube, dividing the inner tube into an upper chamber and a lower chamber;

an acceleration sensitive valve assembly mounted in the bottom of the tubes;

a conduit interconnecting the valve assembly and the upper chamber;

a port in the valve assembly for fluid communication between the lower chamber and the conduit;

an inertial mass blocking the port in a port-closed position and not blocking the port in a port-open position, the inertial mass being normally in a port-closed position in absence of downward acceleration of the tubes of the shock absorber and biased toward a port-open position upon downward acceleration of the tubes of the shock absorber;

a piston valve for permitting fluid flow through the piston upon compression of the shock absorber; and a compression valve in the base valve assembly for controlling fluid flow through a portion of the valve assembly upon compression of the shock absorber, the fluid flow resistance of the compression valve being greater than the fluid flow resistance of the piston valve.

12. A twin tube shock absorber comprising:

an outer tube including means for connecting the tube to the wheel of a vehicle;

an inner tube within the outer tube and an annular reservoir between the tubes;

a piston movable within the inner tube, dividing the inner tube into an upper chamber above the piston and a lower chamber below the piston and means for connecting the piston to the chassis of the vehicle;

an acceleration sensitive valve system mounted in the bottom of the tubes comprising:

an extension flow path from the annular reservoir to the lower chamber and including a check valve for permitting flow from the reservoir to the lower chamber, a compression flow path from the lower chamber to the reservoir and a check valve for metering flow from the lower chamber to the reservoir;

a rebound compliance valve, a port for fluid communication between the rebound compliance valve and the lower chamber, and an inertial mass blocking the port in a port-closed position and not blocking the port in a port-open position, the inertial mass being normally in a port-closed position in absence of downward acceleration of the tubes of the shock absorber and biased toward a port-open position upon downward acceleration of the tubes of the shock absorber, the rebound compliance valve being normally closed for preventing flow from the port and openable to permit flow toward the port; and a conduit connecting the rebound check valve to the upper chamber for flow from the upper chamber through the conduit, through the rebound compliance valve and through the port when the inertial mass is in a port-open position.

13. A twin tube shock absorber according to claim 12 wherein the rebound compliance valve includes a spring with a sufficient spring constant to meter fluid flow upon extension of the shock absorber.

14. A twin tube shock absorber according to claim 12 wherein the port is in a longitudinally extending cylindrical member and the inertial mass surrounds the cylindrical member with an internal cylindrical surface for closing the port, fluid flow from the rebound compliance valve to the lower chamber being outwardly through the port.

15. A twin tube shock absorber as recited in claim 14 further comprising a tapered surface inside the inertial mass, the smaller diameter end of the taper being adjacent the cylindrical surface.

16. A twin tube shock absorber according to claim 12 wherein the conduit comprises a longitudinally extending tube in the annular reservoir having an upper end in fluid communication with the upper chamber and a lower end in fluid communication with the rebound compliance valve.

17. A twin tube shock absorber according to claim 12 wherein the conduit comprises a longitudinally extending tube in the annular reservoir interconnecting the upper chamber and the rebound compliance valve.

18. A twin tube shock absorber as recited in claim 12 further comprising:

a piston valve for permitting fluid flow through the piston upon compression of the shock absorber; and a check valve for controlling fluid through a portion of the valve assembly upon compression of the shock absorber, the fluid flow resistance of the check valve being greater than the fluid flow resistance of the piston valve.

19. A twin tube shock absorber comprising:

an outer tube;

an inner tube within the outer tube and an annular reservoir between the tubes;

a piston movable within the inner tube, dividing the inner tube into an upper chamber and a lower chamber;

a compression check and metering valve in the piston for fluid flow from the lower chamber to the upper chamber;

an extension valve in the piston for fluid flow from the upper chamber to the lower chamber;

a base valve assembly including an acceleration sensitive valve mounted in the bottom of the tubes comprising:

a body having a portion in the inner tube and another portion at an end of the annulus between the tubes, a check valve restricting fluid flow from the lower chamber to the annulus and permitting fluid flow from the annulus into the lower chamber, a compression metering valve for controlling fluid flow from the lower chamber into the annulus, a longitudinally extending cylindrical member that is partly hollow, a port in the cylindrical member for radial flow of fluid from the hollow portion, a rebound compliance valve for controlling fluid flow to the port, an inertial mass surrounding the cylindrical member with an internal cylindrical surface for closing the port in a lower port-closed position and opening the port in an upper port-open position, and a spring which counteracts a gravitational force of the inertial mass and biases the inertial mass toward a significantly reduced weight condition;

a longitudinally extending tube in the annular reservoir having an upper end in fluid communication with the upper chamber and a lower end in fluid communication with the rebound compliance valve;

whereby upon compression of the shock absorber, fluid flows from the lower chamber to the upper chamber via the piston and from the lower chamber to the annular reservoir through the compression metering valve, and upon extension of the shock absorber in absence of downward acceleration of the tubes, fluid flows from the upper chamber to the lower chamber via the piston and from the annular reservoir to the lower chamber, or upon extension of the shock absorber in presence of downward acceleration of the tubes, fluid flows from the upper chamber to the lower chamber via the piston and via the longitudinally extending tube, the rebound compliance valve, and the port, and from the annular reservoir to the lower chamber.

20. A twin tube shock absorber as recited in claim 19 further comprising an increased diameter tapered surface inside the inertial mass, the smaller diameter end of the taper being adjacent the cylindrical surface for balancing flow resistance between the port and the opposite ends of the inertial mass.

* * * * *